United States Patent
Ziel et al.

(10) Patent No.: US 7,356,178 B2
(45) Date of Patent: Apr. 8, 2008

(54) SYSTEM AND METHOD FOR IMPROVED MULTIPLE-DIMENSION IMAGE DISPLAYS

(75) Inventors: Jonathan Mark Ziel, North Andover, MA (US); Karl Thiele, Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 893 days.

(21) Appl. No.: 10/726,832

(22) Filed: Dec. 3, 2003

(65) Prior Publication Data

US 2004/0126007 A1    Jul. 1, 2004

Related U.S. Application Data

(60) Provisional application No. 60/437,512, filed on Dec. 31, 2002.

(51) Int. Cl.
     G06K 9/00          (2006.01)
     G06K 9/40          (2006.01)

(52) U.S. Cl. .................. 382/154; 382/128; 382/254

(58) Field of Classification Search ............... 382/128, 382/154, 204, 254, 311; 345/419–420, 424
See application file for complete search history.

(56) References Cited

U.S. PATENT DOCUMENTS 6,297,799 B1 * 10/2001 Knittel et al. ............... 345/419
6,664,961 B2 * 12/2003 Ray et al. ................... 345/424
2002/0165689 A1 * 11/2002 Callegari .................... 702/156

OTHER PUBLICATIONS

Lee, et al "User-friendly Environment for Virtual Endoscopy", scool of computer science & engineering, seoul national university, pp. 1-9, 2001.*
Vilanova, et al "VIREN: A Virtual Endoscopy System", machine graphics and vision, pp. 469487, 1999.*

* cited by examiner

Primary Examiner—Daniel Mariam

(57) ABSTRACT

An improved imaging system includes a memory-storage unit, a multiple-dimensional image processor configured to convert information within a multiple-dimensional data set to a two-dimensional representation in a plane orthogonal to an operator-identified view axis, and an image-rendering device configured to display the two-dimensional representation of a volume-of-interest contained within the three-dimensional data set, wherein the two-dimensional representation is responsive to pixel values associated with a faceplate orthogonal to the view axis. A method for viewing information includes identifying a view axis that intersects a multiple-dimensional data set, modifying the multiple-dimensional data set to align the multiple-dimension data set responsive to the view axis, locating a portion of a structure-of-interest along a vector parallel to view axis, associating a set of pixels with a faceplate, and generating a composite view in accordance with the faceplate.

32 Claims, 10 Drawing Sheets

SYSTEM AND METHOD FOR IMPROVED MULTIPLE-DIMENSION IMAGE DISPLAYS

CROSS REFERENCE TO RELATED APPLICATION

This application claims the benefit of application Ser. No. 60/437,512, filed on Dec. 31, 2002.

TECHNICAL FIELD

The present system and method relates generally to an image-processing apparatus for generating a multiple-dimension image of one or more objects from volume data, and more particularly to an interactive image-processing apparatus for improving contrast of objects within the volume data.

DESCRIPTION OF THE RELATED ART

While the examination of data which fills a three-dimensional space occurs in all branches of art, science, and engineering, some important and familiar examples involve medical imaging where, for example, computer-aided tomography (CAT or CT), magnetic-resonance imaging (MRI), and other scanning modalities are used to obtain a plurality of cross-sectional images of the human anatomy. Radiologists, physicians, technicians, and patients observe two-dimensional data "slices" to discern what the two-dimensional data implies about the three-dimensional organs and tissue represented by the data. The integration of a large number of two-dimensional data slices places great strain on the human visual system, even for relatively simple volumetric images. As the organ or tissue under investigation becomes more complex, the ability to properly integrate large amounts of two-dimensional data to produce meaningful and understandable three-dimensional mental images may become overwhelming. Consequently, the obtained medical-image data (raw data) is subject to various image processing to generate useful information that can be used by clinicians.

Presently known modalities for generating volumetric data corresponding to a physical system include, CT, MRI, three-dimensional ultrasound, positron-emission tomography (PET), and the like. Although a preferred embodiment of the present system and method for multiple-dimension image processing is described herein in the context of medical-imaging systems which are typically used to investigate internal body parts (e.g., the heart, brain, spinal cord, and various other structures and organs), those skilled in the art will appreciate that the present system and method may be used in conjunction with any suitable data set defining any three (or more)-dimensional distribution of data, regardless of whether the data set represents a physical system, e.g., numerical, graphical, and the like.

Diagnostic imaging modalities (i.e., CT, MRI, ultrasound, etc.) typically acquire complex digital data which is usually, when displayed or printed, processed to map the large dynamic range of the scanner data (typically 12-bit) to that of the display device (typically 8-bits). Processing of the digital data often includes subjecting the data to various control parameters (i.e. windowing, cropping, etc.) to enhance the clinical utility of the digital data. The data is usually processed in the form of digital images and can contain from one to several hundred individual two-dimensional digital images called "slices" in a single volumetric data set.

Prior art methods exist for displaying representations of slices of processed digital data; however, the operator oftentimes must mentally reconstruct the two-dimensional slices into a volumetric image using his existing knowledge of anatomy. Displaying accurate representations of entire volumes ("volume rendering") of processed digital data is much more advantageous in that the final representation contains substantial information about every data element within a data volume. For example, bones, organs, etc., are identified and extracted from three-dimensional information of a patient's anatomy and three-dimensional images showing the structures-of-interest are prepared. Recently, such three-dimensional images have been generated and displayed in clinical medicine for the purpose of diagnosis and medical treatment.

In the medical field, the three-dimensional images to be displayed are produced mainly by two methods. In one of the two methods, an object (e.g., organ, etc.) to display is extracted from volume data, and on the basis of the data of the extracted object, a three-dimensional surface image or "surface display image" is produced. In the other method, voxel values associated with each voxel within the volume data are projected onto a two-dimensional screen (projection plane), as represented by a maximum-intensity projection (MIP) method (e.g., a maximum value projection method, a minimum value projection method) simple averages, threshold averages, opacity functions and/or the like.

The present system and method relates to the later of the two methods. The process of volume rendering comprises multiple stages: collecting the volumetric data, selecting a perspective of interest, ray casting the data from the selected perspective, and forwarding the resulting two-dimensional data to a scan converter for display on a monitor. While volume rendered data contains all the detail available from the two-dimensional data sets from which they are constructed, clinicians often report that the projected quality of volume-rendered images is not as clear as a two-dimensional image. Consequently, further improvements are desired to produce better quality multiple-dimension images.

SUMMARY

An improved multiple-dimensional imaging system comprises a memory-storage unit configured to store a multiple-dimensional data set, an image processor communicatively coupled to the memory-storage unit, the image processor configured to convert the multiple-dimensional data set to a two-dimensional representation in a plane orthogonal to an operator-identified view axis, and an image-rendering device communicatively coupled to the image processor, the rendering device configured to display the two-dimensional representation of a volume-of-interest contained within the three-dimensional data set, wherein the two-dimensional representation is responsive to a faceplate orthogonal to the view axis that includes information associated with a structure-of-interest.

A method for viewing information within a multiple-dimensional data set comprises identifying a view axis that intersects a multiple-dimensional data set, modifying the multiple-dimensional data set to align one of the dimensions of the multiple-dimension data set responsive to the view axis, locating a portion of a structure-of-interest with respect to a distance along a vector parallel to view axis, associating a set of voxels with a faceplate, and generating a composite view in accordance with the faceplate.

BRIEF DESCRIPTION OF THE DRAWINGS

A system and method for improved multiple-dimension image displays are illustrated by way of example and not limited by the embodiments depicted in the following drawings. The components in the drawings are not necessarily to scale. Emphasis instead is placed upon clearly illustrating the principles of the present system and method. Moreover, in the drawings, like reference numerals designate corresponding parts throughout the several views.

DETAILED DESCRIPTION

Figure 1:
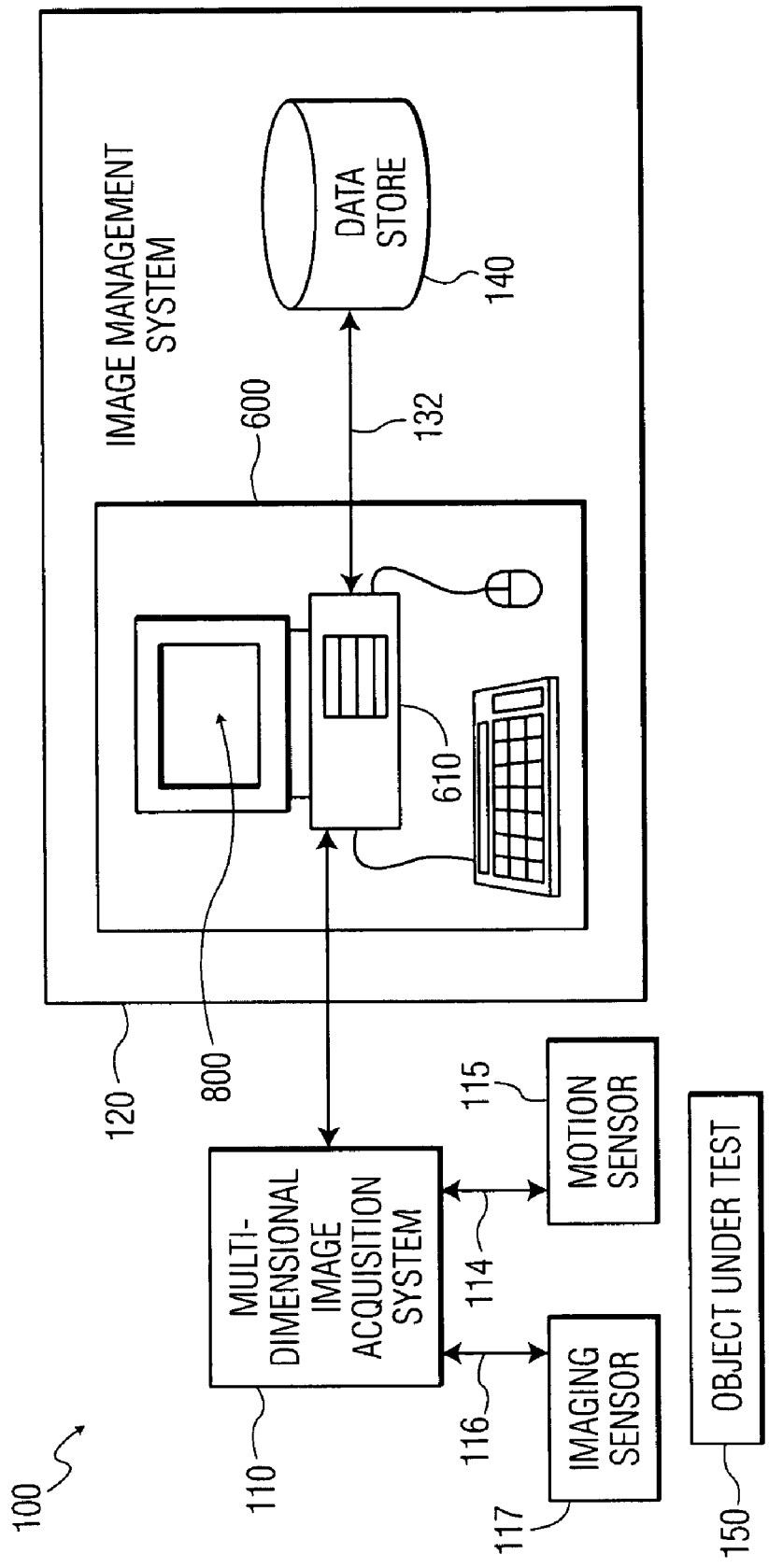
FIG. 1 is a schematic diagram illustrating an embodiment of an image management system.

Ultrasound-imaging systems can create two-dimensional brightness or B-mode images of tissue in which the brightness of a pixel is based on the intensity of the received ultrasound echoes. In another common imaging modality, typically known as color-flow imaging, the flow of blood or movement of tissue is observed. Color-flow imaging takes advantage of the Doppler effect to color-encode image displays. In color-flow imaging, the frequency shift of backscattered-ultrasound waves is used to measure the velocity of the backscatterers from tissues or blood. The frequency of sound waves reflecting from the inside of blood vessels, heart cavities, etc. is shifted in proportion to the velocity of the blood cells. The frequency of ultrasound waves reflected from cells moving towards the transducer is positively shifted. Conversely, the frequency of ultrasound reflections from cells moving away from the transducer is negatively shifted. The Doppler shift may be displayed using different colors to represent speed and direction of flow. To assist diagnosticians and operators, the color-flow image may be superimposed on the B-mode image.

Some ultrasound-imaging systems include features, which enable viewing of clinical data along with three-dimensional images acquired during an examination. For example, the SONOS 7500, commercially available from Koninklijke Philips Electronics N.V., doing business as, Philips Electronics North America Corporation of Tarrytown, N.Y., United States of America, has a feature, which sequences acquired images for tissue motion analysis in multiple dimensions. The SONOS 7500 can acquire and display ultrasound images in three-dimensions and display a sequence of images in accordance with an operator selected view axis in real time. Consequently a physician is no longer constrained to observing tissues-of-interest from a limited set of observation sources.

The present system and method for viewing information within a multiple-dimensional data set identifies a faceplate responsive to an input indicative of an operator preference for a spatial arrangement of a representation of a volume-of-interest located within the data. Thereafter, a composite view comprising information from the faceplate and information from voxels along ray cast lines that intersect the faceplate is generated and rendered to provide diagnosticians and clinicians a three-dimensional image with the image clarity associated with two-dimensional imaging systems. The multiple-dimension data set is time-variant. The present system takes advantage of the time-varying nature of the three-dimensional image information to present a series of three-dimensional images over time. Thus, enabling physicians to observe tissue movement in real-time from desired view perspectives that may or may not match the perspective of the ultrasound transducer used to acquire the image information with the clarity of two-dimensional images.

An improved image-management system having been summarized above, reference will now be made in detail to the description of the system and method as illustrated in the drawings. For clarity of presentation, the imaging system (IS) and an embodiment of the underlying image analyzer will be exemplified and described with focus on the generation of a composite representation of diagnostic-ultrasound images. The method can be applied to various multiple-dimensional data sets as will be understood by those skilled in the art in light of the representative embodiments described below.

Turning now to the drawings, reference is made to FIG. 1, which illustrates a schematic of an embodiment of an IS 100. IS 100 includes a multi-dimensional image-acquisition system 110 as well as an image-management system 120. Image-management system 120 includes a workstation 600 and data store 140. Workstation 600 is communicatively coupled with data store 140 via interface 132.

The multi-dimensional image-acquisition system 110 and image-management system 120 are communicatively coupled to each other via interface 112 to enable an operator of workstation 600 to access, arrange, and display diagnostic images accumulated during one or more patient examinations. Multi-dimensional image-acquisition system 110 is coupled to motion sensor 115 and imaging sensor 117 via interface 114 and interface 116, respectively. Motion sensor 115 is configured to monitor one or more patient parameters or conditions, such as heart rate, respiratory rate, etc. Interface 114 is configured to communicatively couple one or more time-varying signals from one or more transducers included within motion sensor 115 to the multi-dimensional image-acquisition system 110.

As will be explained below, a diagnostic image can be acquired by the multi-dimensional image-acquisition system 110, or otherwise received by, the general-purpose computer 610 operating within image management system 120. For example, a multiple-dimensional image can be acquired from an ultrasound-imaging system, a computer-aided tomography (CAT) imaging system, a magnetic-resonance imaging (MRI) system, among others.

In the examples that follow, object-under-test 150 is a patient. The examples describe heart studies of a patient that include the acquisition, identification, and arrangement of ultrasound echo induced diagnostic images. Consequently, the volume-of-interest in these examples is the patient's heart, structures-of-interest may include one or more valves, ventricle walls, arteries, veins, among others. Subsequent references in the examples below to motion sensor 115 are limited to transducers used in association with electrocardiographic and respiratory processors used in the production of signals representative of heart muscle activity over time.

Imaging sensor 117 is configured to provide a plurality of signals via interface 116 to the multi-dimensional image-acquisition system 110. The plurality of signals are in turn received, buffered, and processed in accordance with known techniques in order to produce one or more graphic representations of various portions of the anatomy of the object-under-test 150. In preferred embodiments, imaging sensor 117 is an ultrasound transducer. In alternative embodiments, imaging sensor 117 can include a magnetic resonance imaging sensor, an x-ray sensor, etc.

Workstation 600 includes a general-purpose computer 610. The general-purpose computer 610 is communicatively coupled to both data store 140 and multi-dimensional image-acquisition system 110 via interface 132 and interface 112, respectively. Interfaces 112, 132 can be wired interfaces, wireless (e.g., a radio-frequency) interfaces, and/or networks that couple workstation 600 to one or more multi-dimensional image-acquisition systems 110 and one or more distributed data storage devices included in data store 140. Alternatively, the image management system 120 can reside in the multi-dimensional image-acquisition system 110.

Interfaces 112, 132 can be interfaces commonly available with general-purpose computers such as a serial, parallel, universal serial bus (USB), USB II, the institute of electrical and electronics engineers (IEEE) 1394 interface, also known as "Firewire®," or the like. Firewire is the registered trademark of Apple Computer, Inc. of Cupertino, Calif., U.S.A. Furthermore, interfaces 112, 132 may use different standards or proprietary communications protocols for different types of image sources.

When interfaces 112, 132 are implemented via a network, the interfaces 112, 132 can be any local area network (LAN) or wide area network (WAN). When configured as a LAN, the LAN can be configured as a ring network, a bus network, and/or a wireless-local network. When the interfaces 112, 132 are implemented over a WAN, the WAN could be the public-switched telephone network, a proprietary network, and/or the public access WAN commonly known as the Internet.

Regardless of the actual network infrastructure used in particular embodiments, diagnostic-image data can be exchanged with general-purpose computer 610 of workstation 600 using various communication protocols. For example, transmission-control protocol/internet protocol (TCP/IP) may be used if the interfaces 112, 132 are configured over a LAN or a WAN. Proprietary data-communication protocols may also be used when the interfaces 112, 132 are configured over a proprietary LAN or WAN.

Regardless of the underlying patient imaging technology used by the multi-dimensional image-acquisition system 110, images of the anatomy of the object-under-test 150 are captured or otherwise acquired by an image-recording subsystem within the multi-dimensional image-acquisition system 110. Acquired images include information defining the characteristics observed for each of a plurality of picture elements or pixels that define the diagnostic image. Each pixel includes digital (i.e., numeric) information describing the colors and intensity of light observed at a particular region of an image sensor. The digital information arranged in a two-dimensional array of pixels can be used by suitably configured devices (e.g., a display monitor associated with the general-purpose computer 610, a photo-quality printer (not shown), etc.) to create a representation of the captured image.

Because various types of image-processing devices can be easily coupled to IS 100 (e.g., a video-tape recorder/player, a digital-video disk (DVD) recorder/player, etc.), previously recorded images stored on various media (e.g., a computer diskette, a flash-memory device, a compact-disk (CD), a magnetic tape, etc.) can be transferred to workstation 600 and/or data store 140 for processing in accordance with an image analyzer and an image viewer application programs operable on the general-purpose computer 610 of the workstation 600. After processing by the image-management system 120 in accordance with preferred methods for arranging and displaying a plurality of the acquired and/or previously stored diagnostic images, the IS 100 can store the various composite image arrangements on a suitable data-storage medium.

Those skilled in the art will understand that a plurality of images from one or more patient studies can be presented in sequence. Such sequences or image loops can be repeated (i.e., the general-purpose computer 610 can present the first image and each subsequent image in the sequence after the last image in the sequence has been presented) as may be desired by a diagnostician or other operator of the image-management system 120.

Any combination of image-acquisition devices and/or data-storage devices may be included in IS 100. In addition, IS 100 may contain more than one image source of the same type. IS 100 may further include devices to which a digital image captured or otherwise acquired from a multi-dimensional image-acquisition system or a data-storage device can be sent. Such devices include hard-copy output devices such as a photo-quality printer.

In a preferred embodiment, among others, the functions of the image-management system 120 are implemented in a combination of software and data executed and stored under the control of the general-purpose computer 610. It should be noted, however, that the image-management system 610 is not dependent upon the nature of the underlying computer in order to accomplish designated functions. Those skilled in the art will understand that various portions of the image-management system 120 can be implemented in hardware, software, firmware, or combinations thereof. In a preferred embodiment, image-management system 120 is implemented using a combination of hardware and software or firmware that is stored in memory and executed by a suitable instruction-execution system. If implemented solely in hardware, as in an alternative embodiment, functions of the image-management system 120 can be implemented with any of or a combination of technologies which are well-known in the art (e.g., discrete-logic circuits, application-specific integrated circuits (ASICs), programmable-gate arrays (PGAs), field-programmable gate arrays (FPGAs), etc.), or later developed technologies.

Figure 2:
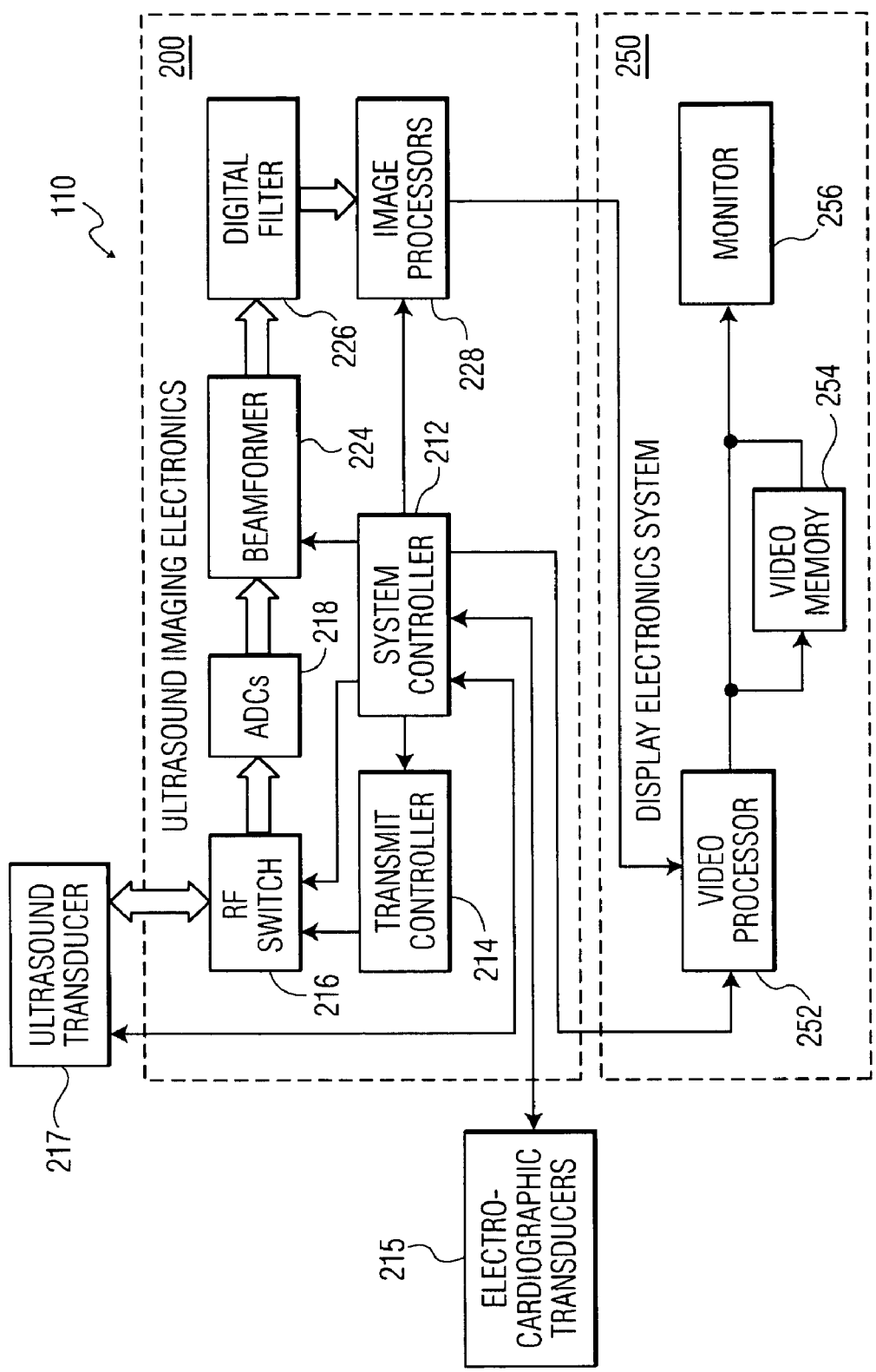
FIG. 2 is a functional block diagram illustrating an embodiment of the multiple-dimension image-acquisition system of FIG. 1.

Reference is now directed to FIG. 2, which illustrates a functional block diagram of an embodiment of the multi-dimensional image-acquisition system 110 of FIG. 1. In this regard, the multi-dimensional image-acquisition system 110 may include ultrasound-imaging electronics 200. As shown in FIG. 2, ultrasound-imaging electronics 200 are in communication with electrocardiographic transducer(s) 215, an ultrasound transducer 217, and a display-electronics system 250. Ultrasound-imaging electronics 200 include a system controller 212 that controls the operation and timing of the various functional elements and signal flows within the multi-dimensional image-acquisition system 110 pursuant to suitable software.

System controller 212 is coupled to transmit controller 214 which produces a plurality of various ultrasound signals that are controllably forwarded to the ultrasound transducer 217 via radio-frequency (RF) switch 216. Ultrasound echoes received from portions of the object-under-test 150 (FIG. 1) are converted to electrical signals in ultrasound transducer 217 and forwarded via RF switch 216 to a receive channel that includes analog to digital converters 218, beamformer 224, digital filter 226, and various image processors 228.

Ultrasound transducer 217 is configured to emit and receive ultrasound signals, or acoustic energy, to and from object-under-test 150. The ultrasound transducer 217 is preferably a phased-array transducer having a plurality of elements both in azimuth and elevation directions.

In one embodiment, the ultrasound transducer 217 comprises an array of elements typically made of a piezoelectric material, for example but not limited to, lead-zirconate-titanate (PZT). Each element is supplied an electrical pulse or other suitable electrical waveform, causing the elements to collectively propagate an ultrasound-pressure wave into object-under-test 150. Moreover, in response thereto, one or more echoes are reflected by various tissues within the object-under-test 150 and are received by the ultrasound transducer 217, which transforms the echoes into a plurality of electrical signals.

The array of elements associated with the ultrasound transducer 217 enable a beam, emanating from the transducer array, to be steered (during transmit and receive modes) through the object-under-test 150 by shifting the phase (introducing a time delay) of the electrical pulses (i.e., the transmit signals) supplied to the separate transducer elements. During a transmit mode, an analog waveform is communicated to each transducer element, thereby causing a pulse to be selectively propagated in a particular direction, like a beam, through the patient.

During a receive mode, an analog waveform is received at each transducer element at each transducer element. Each analog waveform essentially represents a succession of echoes received by the ultrasound transducer 217 over a period-of-time as echoes are received along the single beam through the patient. The entire set of analog waveforms represents an acoustic line, and the entire set of acoustic lines represents a single view, or image, of an object and is commonly referred to as a frame. Each frame represents a separate diagnostic image that can be stored within the image-management system 120 for later arrangement in a preferred diagnostic routine. Note that frame storage (i.e., image-data storage) can be implemented on a frame by frame or a multiple frame basis.

In addition to forwarding the acquired digital images to image-management system 120, multi-dimensional image-acquisition system 110 can forward each image to display electronics systems 250. Display electronics system 250 includes video processor 252, video memory 254, and monitor 256. As shown in FIG. 2, monitor 256 may be configured to receive a video-input signal from video memory 254 and/or video processor 252. This multiple video signal input arrangement enables both real-time image observations, as well as post-test diagnostic viewing of stored diagnostic images. In order to enable post-test diagnostic viewing, video memory 254 can include a digital-video disk (DVD) player/recorder, a compact-disc (CD) player/recorder, a video-cassette recorder (VCR) or other various video-information storage devices.

Those skilled in the art will understand that display-electronics system 250 may be integrated and/or otherwise co-located with the multi-dimensional image-acquisition system 110. Alternatively, the display-electronics system 250 can be integrated and/or otherwise co-located with workstation 600. In other embodiments, separate display-electronics systems 250 can be integrated with workstation 600 and multi-dimensional image-acquisition system 110.

In operation, system controller 212 can be programmed or otherwise configured to forward one or more control signals to direct operation of the transmit controller 214. Generally, a test technician will configure the ultrasound-imaging electronics 200 to coordinate the application of appropriate ultrasound-signal transmissions, as well as to coordinate the selective observation of the resulting ultrasound echoes to record a plurality of image loops. Note that system controller 212 may forward various control signals in response to one or more signals received from electrocardiographic transducers 215 and/or other patient condition sensors (not shown). In response, transmit controller 214 generates a series of electrical pulses that are periodically communicated to a portion of the array of elements of the ultrasound transducer 217 via RF switch 216, causing the transducer elements to emit ultrasound signals into the object-under-test 150 of the nature described previously. The transmit controller 214 typically provides separation (in time) between the pulsed transmissions to enable the ultrasound transducer 217 to receive echoes from tissues during the period between pulsed transmissions. RF switch 216 forwards the received echoes via the ADCs 218 to a set of parallel channels within the beamformer 224.

When the transmit pulses (in the form of ultrasound energy) encounter a tissue layer of the object-under-test 150 that is receptive to ultrasound insonification, the multiple transmit pulses penetrate the tissue layer. As long as the magnitude of the multiple ultrasound pulses exceeds the attenuation affects of the tissue layer, the multiple ultrasound pulses will reach an internal target. Those skilled in the art will appreciate that tissue boundaries or intersections between tissues with different ultrasound impedances will develop ultrasound responses at the fundamental or transmit frequency, $f_t$, of the plurality of ultrasound pulses. Tissue insonified with ultrasound pulses will develop fundamental-ultrasound responses that may be distinguished in time from the transmit pulses to convey information from the various tissue boundaries within a patient.

Those ultrasound reflections of a magnitude that exceed that of the attenuation affects from traversing tissue layer may be monitored and converted into an electrical representation of the received ultrasound echoes. Those skilled in the art will appreciate that those tissue boundaries or intersections between tissues with different ultrasound impedances will develop ultrasound responses at both the fundamental frequency, $f_t$, as well as, at harmonics (e.g., $2f_t$, $3f_t$, $4f_t$, etc.) of the fundamental frequency of the plurality of ultrasound pulses. Tissue insonified with ultrasound pulses will develop both fundamental and harmonic-ultrasound responses that may be distinguished in time from the transmit pulses to convey information from the various tissue boundaries within a patient. It will be further appreciated that tissue insonified with ultrasound pulses develops harmonic responses because the compressional portion of the insonified waveforms travels faster than the rarefactional portions. The different rates of travel of the compressional and the rarefactional portions of the waveform causes the wave to distort producing a harmonic signal, which is reflected or scattered back through the various tissue boundaries.

Preferably, ultrasound-imaging electronics 200 transmit a plurality of ultrasound pulses via ultrasound transducer 217 at a fundamental frequency and receive a plurality of ultrasound-echo pulses or receive pulses at an integer harmonic of the fundamental frequency. Those skilled in the art will appreciate that harmonic responses may be received by the same transducer when the ultrasound transducer 217 has an appropriately wide frequency band width.

While the object-under-test 150 will produce harmonic responses at integer multiples of the fundamental frequency, various contrast agents have been shown to produce subharmonic, harmonic, and ultraharmonic responses to incident ultrasound pulses. Consequently, observation of ultrasound echoes when the patient-under-test 150 has been treated (i.e., injected) with one or more contrast agents has proven beneficial to monitoring cardiac chambers, valves, and blood supply dynamics. Those ultrasound reflections of a magnitude that exceed that of the attenuation affects from traversing the various tissues of the patient-under-test 150 are converted into a plurality of electrical signal by the ultrasound transducer 217.

Beamformer 224 receives the echoes as a series of waveforms converted by ADCs 218. More specifically, beamformer 224 receives a digital version of an analog waveform from a corresponding transducer element for each acoustic line. Moreover, beamformer 224 receives a series of waveform sets, one set for each separate acoustic line, in succession over time and processes the waveforms in a pipeline-processing manner. Because the ultrasound signals received by ultrasound transducer 217 are of low power, a set of preamplifiers (not shown) may be disposed within beamformer 224.

In this way, beamformer 224 receives a series of waveforms corresponding to separate acoustic lines in succession over time and processes the data in a pipeline-processing manner. Beamformer 224 combines the series of received waveforms to form a single acoustic line. To accomplish this task, beamformer 224 may delay the separate echo waveforms by different amounts of time and then may add the delayed waveforms together, to create a composite digital RF acoustic line. The foregoing delay and sum beamforming process is well known in the art. Furthermore, beamformer 224 may receive a series of data collections for separate acoustic lines in succession over time and process the data in a pipeline-processing manner.

Because the echo waveforms typically decay in amplitude as they are received from progressively deeper depths in the patient, beamformer 224 may further comprise a parallel plurality of time-gain compensators (TGCs—not shown), which are designed to progressively increase the gain along the length of each acoustic line, thereby reducing the dynamic range requirements on subsequent processing stages. Moreover, the set of TGCs may receive a series of waveform sets, one set for each separate acoustic line, in succession over time and may process the waveforms in a pipeline-processing manner.

Each of the waveforms processed by beamformer 224 may be forwarded to digital filter 226. The waveforms include a number of discrete-location points (hundreds to thousands; corresponding with depth and ultrasound-transmit frequency) with respective quantized instantaneous signal levels, as is well known in the art. In previous ultrasound-imaging systems, this conversion often occurred later in the signal-processing stages, but recently, many of the logical functions that are performed on the ultrasonic signals can be digital, and hence, the conversion is preferred at an early stage in the signal-processing process.

Digital filter 226 can be configured as a frequency band pass filter configured to remove undesired high-frequency out-of-band noise from the plurality of waveforms. The output of the digital filter 226 can then be coupled to an I, Q demodulator (not shown) configured to receive and process digital-acoustic lines in succession. The I, Q demodulator may comprise a local oscillator that may be configured to mix the received digital-acoustic lines with a complex signal having an in-phase (real) signal and a quadrature-phase (imaginary) signal that are ninety degrees out-of-phase from one another. The mixing operation may produce sum and difference-frequency signals. The sum-frequency signal may be filtered (removed), leaving the difference-frequency signal, which is a complex signal centered near zero frequency. This complex signal is desired to follow direction of movement of anatomical structures imaged in the object-under-test, and to allow accurate, wide-bandwidth amplitude detection.

Up to this point in the ultrasound echo-receive process, all operations can be considered substantially linear, so that the order of operations may be rearranged while maintaining substantially equivalent function. For example, in some systems it may be desirable to mix to a lower intermediate frequency or to baseband before beamforming or filtering. Such rearrangements of substantially linear processing functions are considered to be within the skill set of those skilled in the art of ultrasound-imaging systems.

A plurality of signal processors 228 are coupled to the output of the digital filter 226 via I, Q demodulator. For example, a B-mode processor, a Doppler processor, a three-dimensional, and/or a color-flow processor, among others may be introduced at the output of the I, Q demodulator. Each of the image processors 228 includes a suitable species of random-access memory (RAM) and is configured to receive the filtered digital-acoustic lines. The acoustic lines can be defined within a two-dimensional coordinate space and may contain additional information that can be used in generating a three-dimensional image. Furthermore, the various image processors 228 accumulate acoustic lines of data over time for signal manipulation.

Regardless of the location of the display-electronics system 250, video processor 252 may be configured to produce two-dimensional and three-dimensional images from the data in the RAM once an entire data frame (i.e., a set of all acoustic lines in a single view or image to be displayed) has been accumulated by the RAM. For example, if the received data is stored in RAM using polar coordinates to define the relative location of the echo information, the video processor 252 may convert the polar coordinate data into three-dimensional (orthogonal) data (see FIG. 3) capable of raster scan conversion via a raster-scan capable display monitor 256.

When motion sensor 115 (FIG. 1) includes a plurality of electrocardiographic transducers 215 placed on the patient-under-test's chest, the plurality of transducers generate a set of electrical signals that represent chest movement over time. Because human heart and respiratory motion is periodic, characteristic portions of signals produced by electro-cardiographic transducers 215 can be used to trigger or otherwise coordinate the application of one or more transmit control signals via RF switch 216 to the ultrasound transducer 216 (FIG. 2). When the multi-dimensional image-acquisition system 110 is an ultrasound imaging system, ultrasound energy echoes received in the ultrasound transducer 217 as a result of transmitted ultrasound energy can be used to produce images that capture the heart muscle during specific events within the heart cycle. For example, one skilled in the art could coordinate the acquisition of an ultrasound image of the patient's heart that corresponds to the systole and diastole of the left ventricle. By coordinating the acquisition of multiple images of a patient's heart at a similar point in the heart cycle under multiple image-acquisition modes, viewing orientations, and patient conditions, a diagnostician can increase their understanding of the patient's condition.

Figure 3:
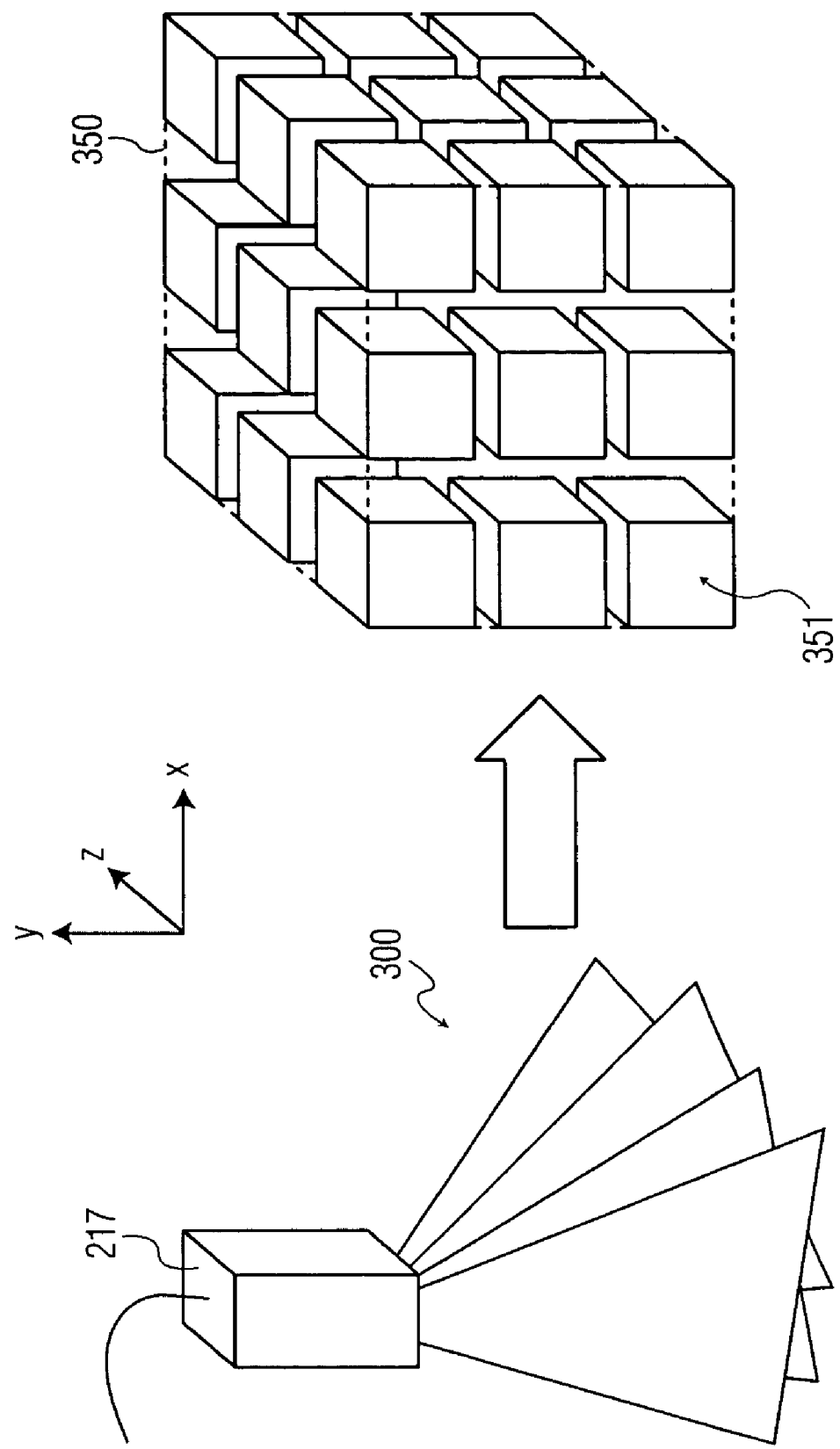
FIG. 3 is a schematic diagram illustrating a data conversion performed by the multi-dimensional image-acquisition system of FIG. 1.

FIG. 3 illustrates the process of converting a plurality of ultrasound scan lines 300 represented in polar coordinates into a multi-dimensional data set 350 having rectangular coordinates in accordance with x, y, and z, axes as shown. Specifically, the image information in each of the plurality of ultrasound scan lines 300 can be associated with a plurality of voxels 351. Each voxel 351 contains information responsive to its relative location with respect to a reference defined at the intersection of the x, y, and z axes. In addition, each voxel 351 contains information responsive to a localized opacity, density, and color. Color information can include red, green, and blue components.

Figure 4A:
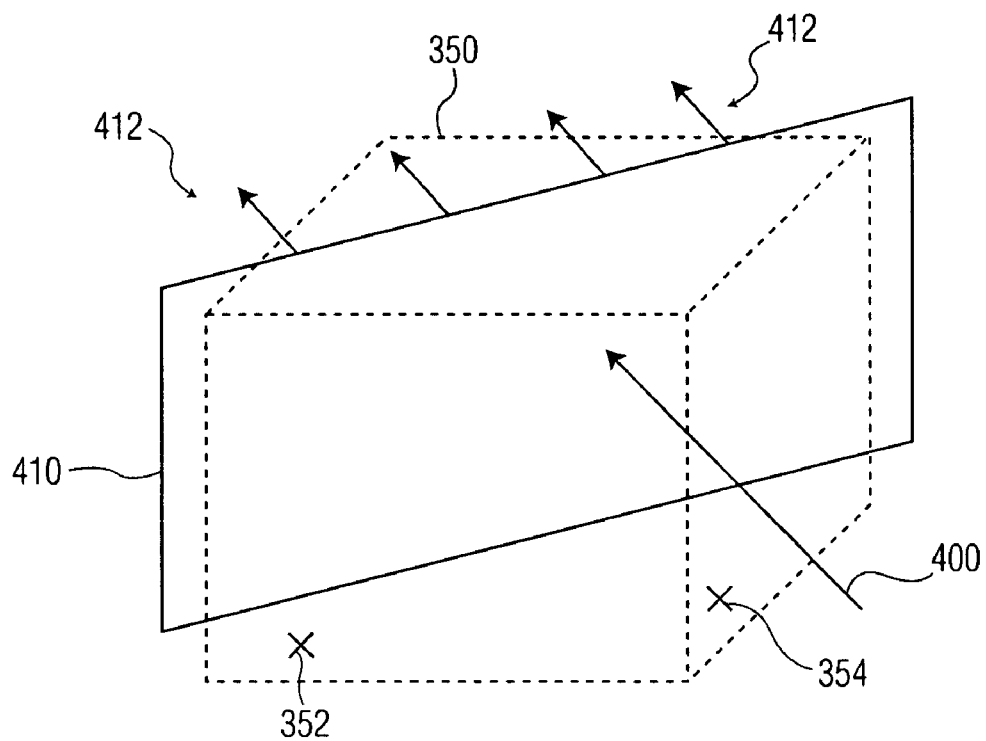
FIGS. 4A-4B are schematics illustrating an embodiment of volume rendering over the multi-dimension data of FIG. 3.

FIG. 4A is a schematic diagram illustrating an example arrangement of the multi-dimensional data set 350 of FIG. 3 in association with a two-dimensional plane-of-interest 410. In the embodiment illustrated in FIG. 4A, view axis 400 is a vector (illustrated as an arrow) defining an operator-selected observation perspective in relation to the imaging information contained within the multi-dimensional data set 350. View axis 400 is a function of the x, y, and z, axes shown in FIG. 3. In preferred embodiments, view axis 400 is operator configurable in each of the x, y, and z axes. In other embodiments, view axis 400 can be pre-configured in accordance with one or more arrangements based on operator, subject matter, data acquisition mode, or perhaps other criteria.

In the representative embodiment, view axis 400 is orthogonal to the two-dimensional plane-of-interest 410. However, the relative orientation between view axis 400 and the two-dimensional plane-of-interest 410 is unlimited. Embodiments supporting alternative relationships between view axis 400 and the two-dimensional plane-of-interest 410 may include an interface that enables an operator of image management system 120 (FIG. 1) to controllably position the two-dimensional plane-of-interest 410.

Figure 4B:
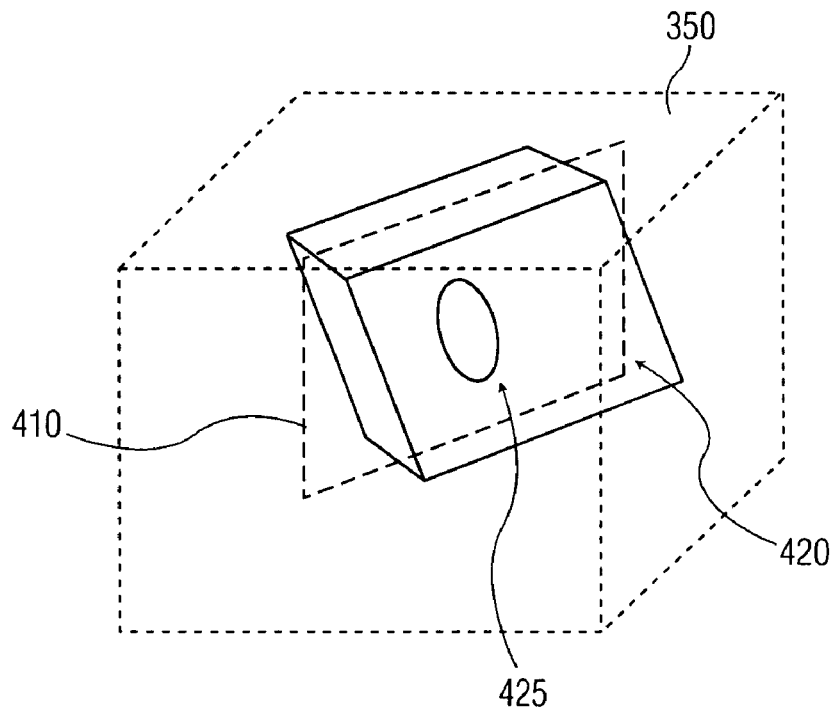

The distance or depth of the two-dimensional plane-of-interest 410 along the vector defined by view axis 400 is determined in accordance with one or more imaging parameters associated with individual voxels within the multi-dimensional data set 350. In some embodiments, the distance of the two-dimensional plane-of-interest 410 along view axis 400 from an external surface (e.g., external surfaces 352, 354) of the multi-dimensional data set 350 is determined in accordance with an opacity value associated with the voxels. A comparison of opacity values associated with voxels along ray-cast lines 412 with a threshold opacity can be used to identify a structure-of-interest 425 within volume of interest 420 as illustrated in FIG. 4B.

Figure 5:
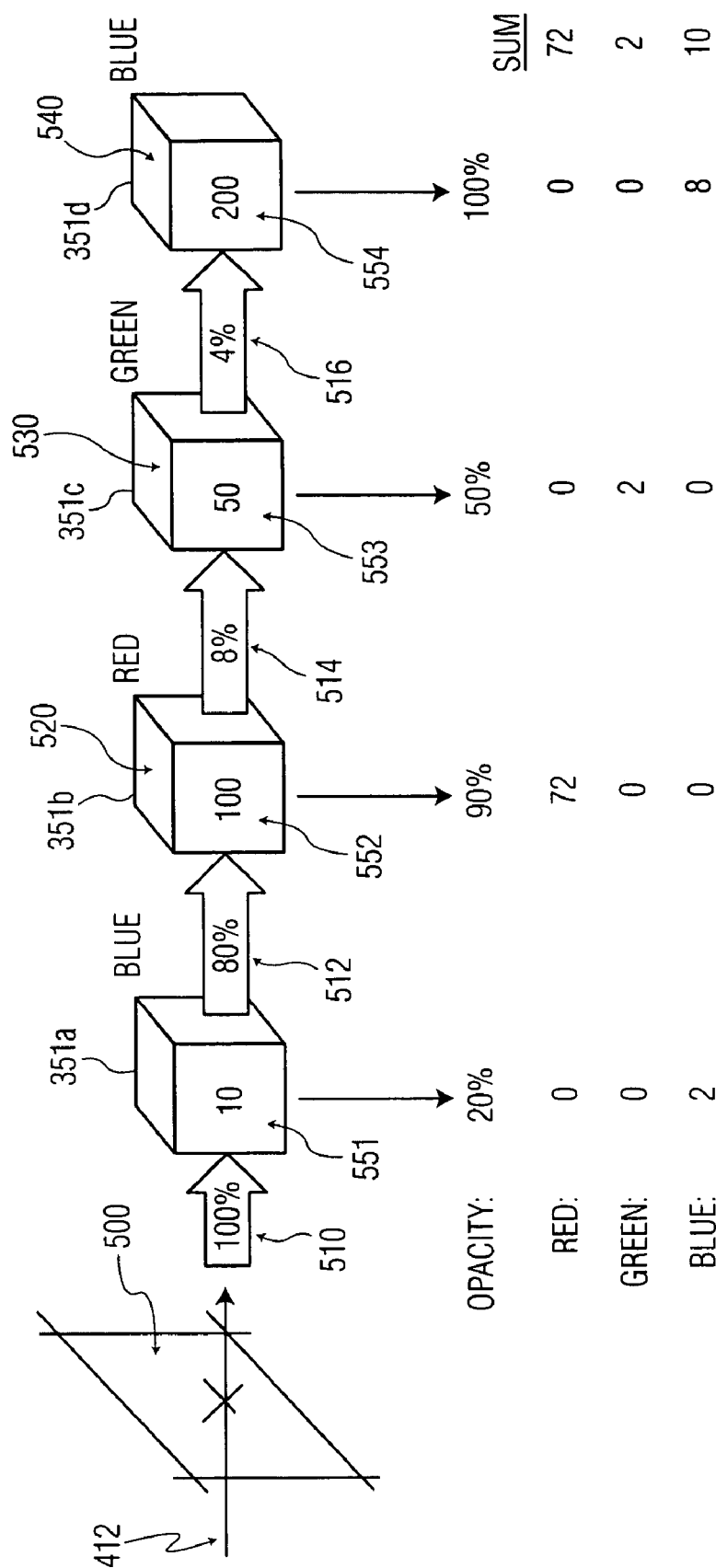
FIG. 5 is a schematic diagram illustrating an embodiment of three-dimensional rendering of an individual voxel of FIG. 3.

Reference is now directed to FIG. 5 which illustrates an embodiment of a method for ray-casting a plurality of voxels to generate a corresponding pixel. As illustrated in the representative embodiment, an observer facing pixel 500 along ray-cast line 412 is presented with pixel components derived from voxels 351*a*, 351*b*, 351*c*, and 351*d*. Specifically, pixel 500 is represented as a function of the sum of individual blue, red, and green color components, as well as corresponding color density 551, 552, 553, 554 and opacity values. Incident light 510 is both reflected and absorbed by each of the voxels 351*a*, 351*b*, 351*c*, and 351*d*. In the representative embodiment of FIG. 5, each of the voxels 351*a*, 351*b*, 351*c*, and 351*d* is associated with a single color component classified as blue, red, or green. Other color classifications are possible. In addition, to other color classification schemes, it should be understood that each voxel can include a combination of multiple color values (e.g., a voxel with a blue color component and a green color component).

As illustrated in the example, incident light 510 encounters voxel 351*a* which has an opacity value of 20% and a color-density value 551 of 10. Voxel 351*a* reflects blue light. In accordance with the opacity value of 20%, 80% of the incident light along ray-cast line 412 traverses voxel 351*a* and becomes light 512 incident upon voxel 351*b*. In accordance with the color density value 551 of 10 and the opacity of 20%, the blue color component associated with voxel 351*a* is 2 (i.e., voxel color component=voxel color density×voxel opacity×incident light).

In turn, light 512 enters voxel 351*b*. Voxel 351*b* reflects red light, has an opacity value of 90%, and a color density value 552 of 100. Thus, the red color component contributed to pixel 500 by voxel 351*b* is 72 (i.e., 72=100×90%×80%). In accordance with the opacity value of 90%, only 8% of incident light 510 traverses both voxel 351*a* and voxel 351*b*.

Light 514 enters voxel 351*c*. Voxel 351*c* reflects green light, has an opacity value of 50%, and a color density value 553 of 50. Accordingly, the green component contributed to pixel 500 by voxel 351*c* is 2 (i.e., 2=50×50%×8%). Because of the opacity value of 50%, only 4% of incident light 510 traverses voxels 351*a*, 351*b*, and 351*c*.

Light 516 enters voxel 351*d*. Voxel 351*d* reflects blue light, has an opacity value of 100%, and a color density value 553 of 200. Accordingly, the blue component contributed to pixel 500 by voxel 351*d* is 8 (i.e., 8=200×100%×4%). In accordance with the opacity value of 100%, no light traverses voxel 351*d* along the ray-cast line 412. As shown in the color component results table of FIG. 5 pixel 500 comprises a red color component of 72 a green color component of 2 and a blue color component of 10.

Figure 6:
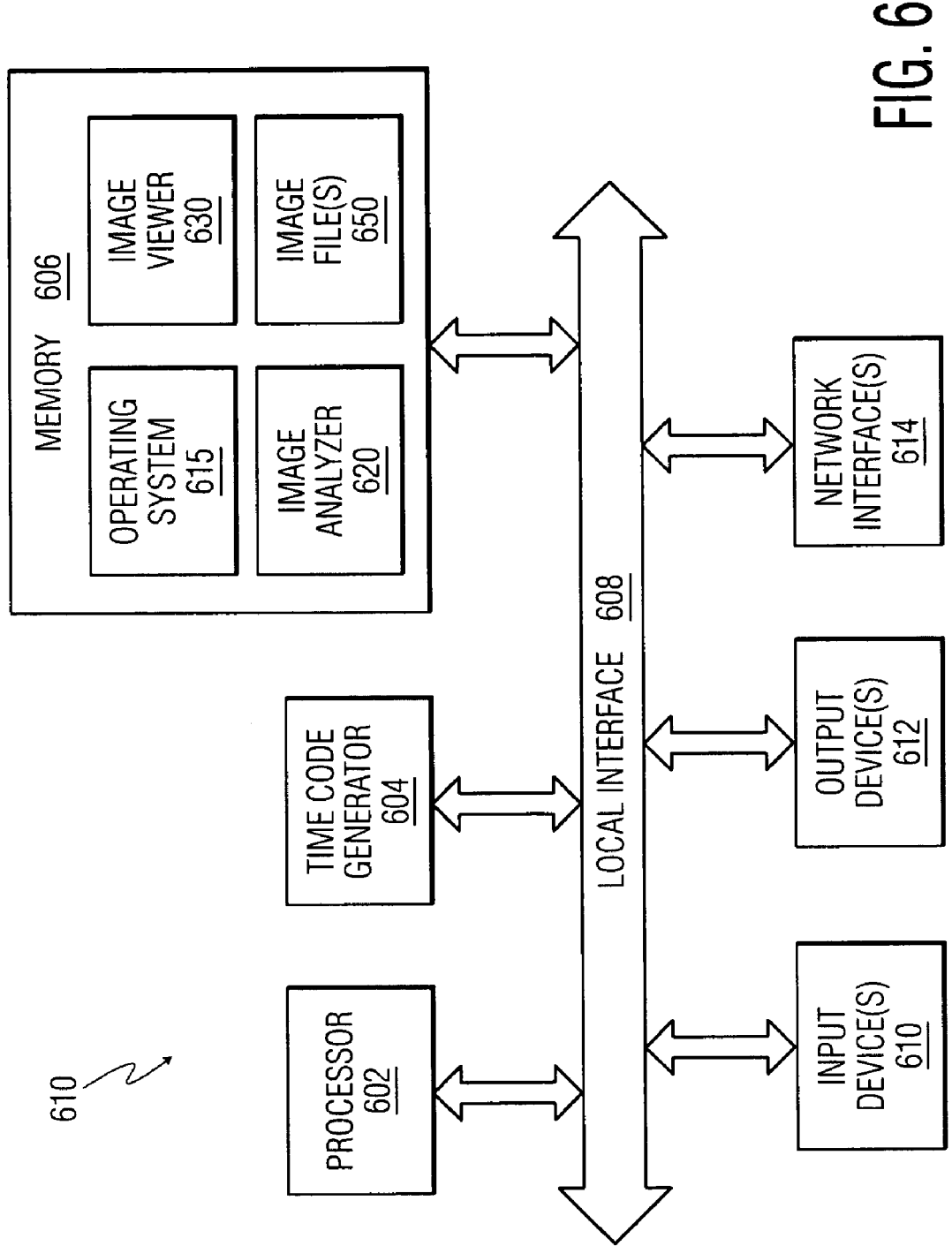
FIG. 6 is a functional block diagram illustrating an embodiment of the computing device of FIG. 1.

Reference is now directed to FIG. 6, which illustrates a functional block diagram of the general-purpose computer 610 of FIG. 1. Generally, in terms of hardware architecture, as shown in FIG. 6, the general-purpose computer 610 may include a processor 602, memory 606, input device(s) 610, output device(s) 612, and network interface(s) 614, that are communicatively coupled via local interface 608.

Local interface 608 can be, for example but not limited to, one or more buses or other wired or wireless connections, as is known in the art or may be later developed. Local interface 608 may have additional elements, which are omitted for simplicity, such as controllers, buffers (caches), drivers, repeaters, and receivers, to enable communications. Further, local interface 608 may include address, control, and/or data connections to enable appropriate communications among the aforementioned components of the general-purpose computer 610.

In the embodiment of FIG. 6, the processor 602 is a hardware device for executing software that can be stored in memory 606. The processor 602 can be any custom-made or commercially-available processor, a central-processing unit (CPU) or an auxiliary processor among several processors associated with the general-purpose computer 610 and a semiconductor-based microprocessor.

The memory 606 can include any one or combination of volatile memory elements (e.g., random-access memory (RAM, such as dynamic-RAM or DRAM, static-RAM or SRAM, etc.)) and nonvolatile-memory elements (e.g., read-only memory (ROM), hard drives, tape drives, compact-disk drives (CD-ROMs), etc.). Moreover, the memory 606 may incorporate electronic, magnetic, optical, and/or other types of storage media now known or later developed. Note that the memory 606 can have a distributed architecture, where various components are situated remote from one another, such as in data store 140 (FIG. 1) but accessible by processor 602.

The software in memory 606 may include one or more separate programs, each of which comprises an ordered listing of executable instructions for implementing logical functions. In the example of FIG. 6, the software in the memory 606 includes image analyzer 620 that functions as a result of and in accordance with operating system 615. Memory 606 also includes image viewer 630 and image files 650 that contain information used to produce one or more representations of diagnostic images acquired by the multi-dimensional image-acquisition system 110 of FIG. 1. Operating system 615 preferably controls the execution of computer programs, such as image analyzer 620, and provides scheduling, input-output control, file and data management, memory management, and communication control and related services.

In an embodiment, image analyzer 620 is one or more source programs, executable programs (object code), scripts, or other collections each comprising a set of instructions to be performed. It will be well understood by one skilled in the art, after having become familiar with the teachings of the system and method, that image analyzer 620 may be written in a number of programming languages now known or later developed.

The input device(s) 610 may include, but are not limited to, a keyboard, a mouse, or other interactive-pointing devices, voice-activated interfaces, or other operator-machine interfaces (omitted for simplicity of illustration) now known or later developed. The input device(s) 610 can also take the form of an image-acquisition device or a data-file transfer device (e.g., a floppy-disk drive, a digital-video disk (DVD) player, etc.). Each of the various input device(s) 610 may be in communication with the processor 602 and/or the memory 606 via the local interface 608. Data received from an image-acquisition device connected as an input device 610 or via the network interface device(s) 614 may take the form of a plurality of voxels, or a data file such as image file 650.

The output device(s) 612 may include a video interface that supplies a video-output signal to a display monitor associated with the respective general-purpose computer 610. Display devices that can be associated with the general-purpose computer 610 are conventional CRT based displays, liquid-crystal displays (LCDs), plasma displays, image projectors, or other display types now known or later developed. It should be understood, that various output device(s) 612 may also be integrated via local interface 608 and/or via network-interface device(s) 614 to other well-known devices such as plotters, printers, copiers, etc.

Local interface 608 may also be in communication with input/output devices that communicatively couple the general-purpose computer 610 to a network. These two-way communication devices include, but are not limited to, modulators/demodulators (modems), network-interface cards (NICs), radio frequency (RF) or other transceivers, telephonic interfaces, bridges, and routers. For simplicity of illustration, such two-way communication devices are represented by network interface(s) 614.

Local interface 608 is also in communication with time-code generator 604. Time-code generator 604 provides a time-varying signal to the image analyzer 620. The time-varying signal can be generated from an internal clock within the general-purpose computer 610. Alternatively, the time-code generator 604 may be in synchronization with an externally generated timing signal. Regardless of its source, time-code generator 604 forwards the time-varying signal that is received and applied by image analyzer 620 each time an image is acquired by the image-management system 120 (FIG. 1) for the first time.

When the general-purpose computer 610 is in operation, the processor 602 is configured to execute software stored within the memory 606, to communicate data to and from the memory 606, and to generally control operations of the general-purpose computer 610 pursuant to the software. The image analyzer 620, image viewer 630, and the operating system 615, in whole or in part, but typically the latter, are read by the processor 602, perhaps buffered within the processor 602, and then executed.

The image analyzer 620 can be embodied in any computer-readable medium for use by or in connection with an instruction-execution system, apparatus, or device, such as a computer-based system, processor-containing system, or other system that can fetch the instructions from the instruction-execution system, apparatus, or device, and execute the instructions. In the context of this disclosure, a "computer-readable medium" can be any means that can store, communicate, propagate, or transport a program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium now known or later developed. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 7:
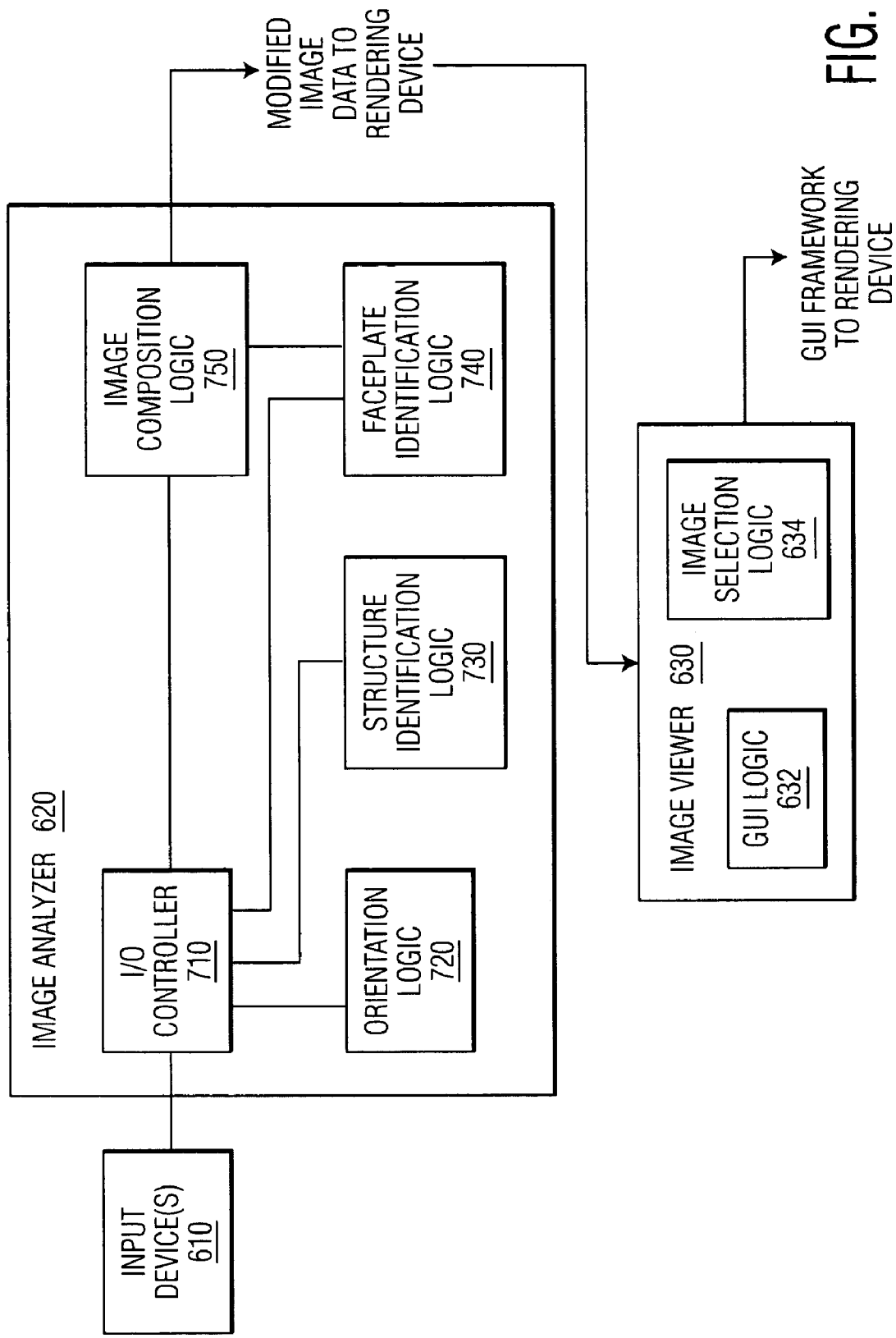
FIG. 7 is a functional block diagram illustrating an embodiment of the image analyzer and image viewer applications of FIG. 6.

Reference is now directed to the functional block diagram of FIG. 7, which illustrates an embodiment of the image analyzer 620 of FIG. 6. As shown in FIG. 7, I/O controller 710 receives one or more operator selectable inputs from inputs device(s) 610 and forwards the one or more inputs to orientation logic 720, structure identification logic 730 and faceplate identification logic 740. In turn these component logic modules are used in conjunction with I/O controller 710 and image composition logic 750 to generate modified multi-dimensional image information in a two-dimensional data structure to a rendering device. It should be understood that a series of time-variant images can be generated by image analyzer 620 to produce a video segment that contains information responsive to the motion of structures within a volume-of-interest 420 located within multi-dimensional data set 350 over time. It should be further understood that the video segment can be repeated to observe the motion of these structures over time.

Orientation logic 720 receives one or more operated directed signals indicative of a preferred view axis 400 for observing a volume-of-interest 420 represented within the multi-dimensional data set 350. Orientation logic 720 further includes voxel manipulation logic that arranges each voxel of the multi-dimensional data set 350 in accordance with view axis 400. Orientation logic 720 also includes logic configured to identify a two-dimensional plane-of-interest 410 that intersects the multi-dimensional data set 350. As described above, the two-dimensional plane-of-interest 410 is identified in accordance with operator preferences or in accordance with a default orientation with respect to the view axis 400.

Structure identification logic 730 receives one or more operated directed signals and/or image management system default values that instruct the image analyzer 620 to ray cast project the imaging information within the multi-dimensional data set 350 in a plurality of vectors parallel to view axis 400. Structure identification logic 730 applies a comparison of ray cast encountered voxel parameters at a position identified by the two-dimensional plane-of-interest 410 to locate a structure-of-interest 425 within volume-of-interest 420 represented within the multi-dimensional data set 350. As described above, structure identification logic may apply a threshold opacity value that corresponds with a known image density values for particular structures-of-interest 425.

As is further illustrated in the functional block diagram of FIG. 7, image viewer 630 receives the modified image information and uses GUI logic 632 and image selection logic 634 to generate operator directed real-time motion studies of structures within a volume-of-interest 420 represented in the multi-dimensional data set 350. GUI logic 632 includes modules configured to enable an operator of image management system 120 (FIG. 1) to configure multiple views for concurrent presentation in a time synchronized manner. In this regard, GUI logic 632 is configured to be responsive to user configurable input signals responsive to preferred view modes of one or more than one structure-of-interest 425 represented within the modified image data.

Modified image data comprises a function of pixel information associated with a faceplate and voxel values associated with voxels along the ray cast line that intersect the two-dimensional plane-of-interest used to locate the faceplate within the volume. In some embodiments, one or more image parameters are modified in accordance with a mathematical combination. In other embodiments, image parameters associated with select voxels are entirely replaced by information derived from the faceplate.

Image selection logic 634 is configured to respond to one or more user inputs indicating an operator's preferred view orientation for structures identified in the two-dimensional plane-of-interest. Thus, an operator of the image management system 120 is empowered to selectively view a plurality of time-variant three-dimensional representations at a clarity level previously associated with two-dimensional imaging data.

Figure 8:
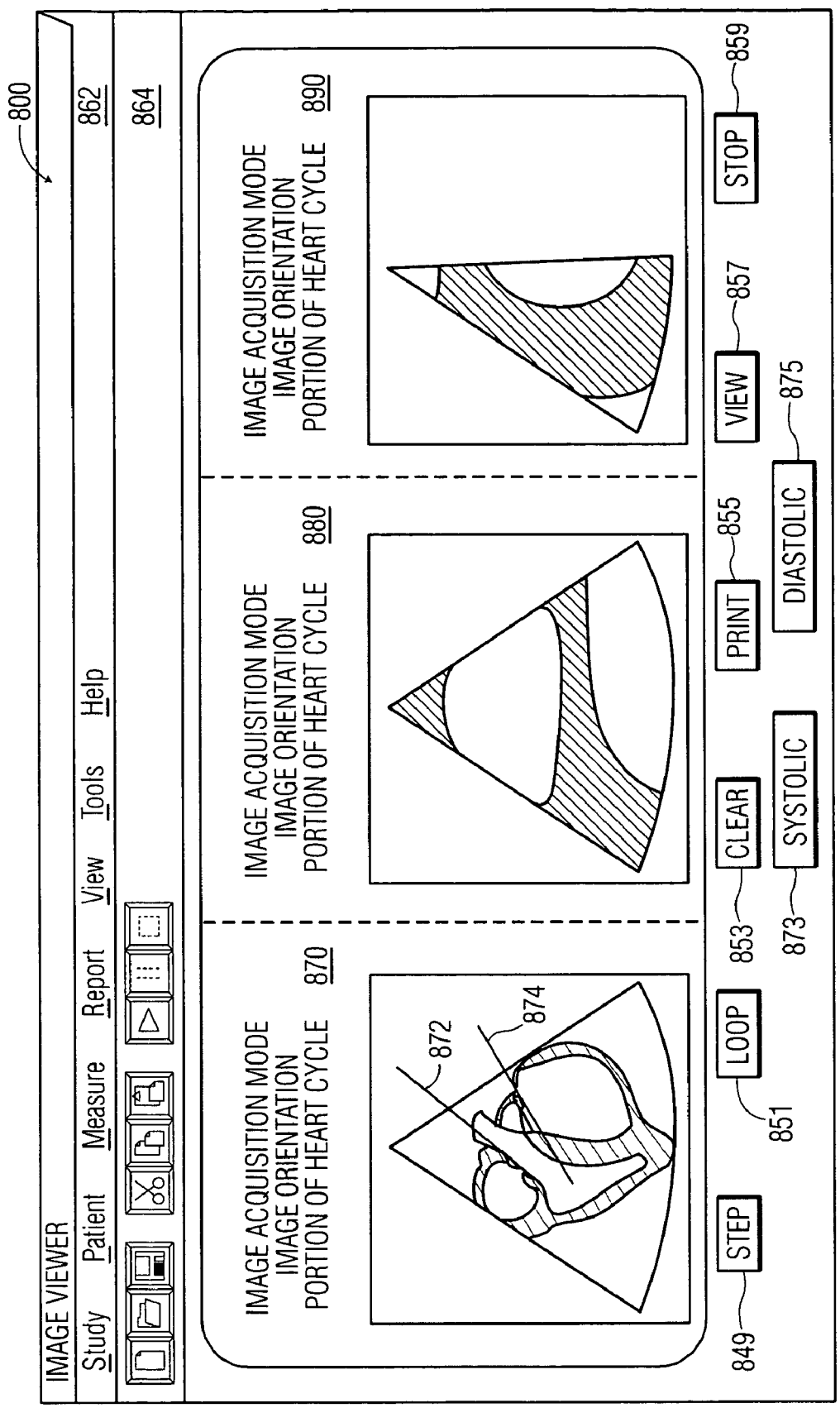
FIG. 8 is a schematic diagram illustrating an embodiment of a graphical-user interface that can be produced using the computing device of FIG. 6.

FIG. 8 illustrates an embodiment of image viewer 630 that can be programmed to present a plurality of diagnostic images in accordance with the observation preferences of a diagnostician of the image-management system 120. As shown in FIG. 8, image viewer graphical-user interface (GUI) 800 includes a pull-down menu bar 862 and a plurality of iconic task pushbuttons in icon bar 864. GUI 800 includes a first panel 870 (e.g., the left-side diagnostic image), a second panel 880 (e.g., the middle diagnostic image), and a third panel 890 (e.g., the right-side diagnostic image). Each of the first, second, and third panels 870, 880, 890 includes one or more labels detailing an image acquisition mode, image orientation, and a portion of the patient under observations' heart cycle. It will be understood that more or less labels may be presented to identify the image associated with each respective panel.

First panel 870 includes a two-dimensional representation of a three-dimensional image of a patient's heart organ as observed as if a two-dimensional plane-of-interest separated a front portion of the heart from a rear portion of the heart with the front portion removed to observe real-time wall motion and valve operation. Image select indicator 872 references a secondary view-of-interest with respect to the orientation and structures in first panel 870. In the embodiment illustrated in FIG. 8, the secondary-view of interest is presented in second panel 880. Image select indicator 874 references a third view-of-interest with respect to the orientation and structures in first panel 870. The third view-of-interest is presented in third panel 890.

Image viewer GUI 800 also includes a plurality of functional pushbuttons labeled "step," "loop," "clear," "print," "view," and "stop." Step pushbutton 849 is associated with logic that displays successive diagnostic images one at a time within each of the first, second, and third panels 870, 880, 890, respectively, in the sequence that they were acquired during the examination. Loop pushbutton 851 is associated with logic that displays successive diagnostic images within each of the first, second, and third panels 870, 880, 890, respectively, in real-time or as triggered by various portions of the heart cycle in the sequence that they were acquired during the examination. Image loops are desirable for observing contrast agent perfusion of tissues-of-interest, which may take several cardiac cycles. Clear pushbutton 853 is associated with logic that removes the diagnostic images of the tissue(s)-of-interest from select panels 870, 880, 890 of image viewer GUI 800. Print pushbutton 855 is associated with logic that forwards the present condition of the image viewer GUI 800 to a hard-copy device of choice. View pushbutton 857 is associated with logic that enables a diagnostician to enlarge a select portion of the diagnostic images of the tissue(s)-of-interest and or otherwise adjust view axis 400. Preferably, when the diagnostician indicates that an image within one of the first, second, and third panels 870, 880, and 890, respectively, should be enlarged, the remaining diagnostic images respond accordingly. Stop pushbutton 859 is associated with logic that prevents the image viewer GUI 800 from progressing to a subsequent set of images while in a loop display mode.

Image viewer GUI 800 includes additional control interfaces that enable a diagnostician to modify various preferred arrangements of the diagnostic images. The additional control interfaces include end-systolic pushbutton 873 and end-diastolic pushbutton 875. End-systolic pushbutton 873 is associated with logic that identifies and displays diagnostic images acquired in synchronization with the termination of the systolic portion of the patient's heart cycle. End-diastolic pushbutton 875 is associated with logic that identifies and displays diagnostic images acquired in synchronization with the termination of the diastolic portion of the patient's heart cycle.

Figure 9:
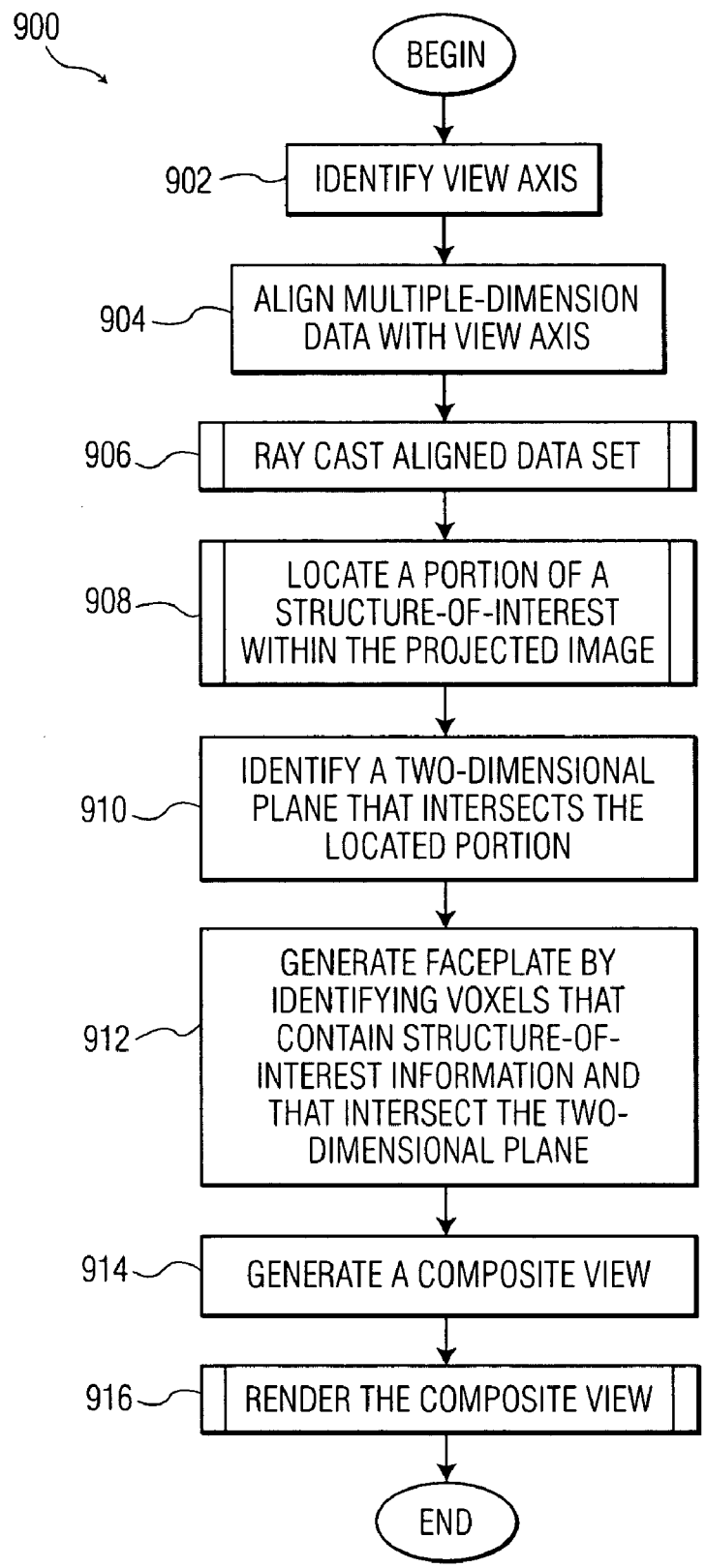
FIG. 9 is a flow chart illustrating an embodiment of a method for improved multiple-dimension image displays that may be implemented by the computing device of FIG. 6.

Reference is now directed to FIG. 9, which illustrates a flowchart describing an embodiment of a method for improved multi-dimensional image displays 900 that may be implemented by the image-management system 120 of FIG. 1. As illustrated in FIG. 9, method 900 begins with identifying a view axis as indicated in operation 902. Next, as shown in operation 904, the multiple-dimension data set is aligned in response to the view axis. In preferred embodiments, the multiple-dimension data is aligned such that one of the axes is parallel with respect to the view axis. However, method 900 is not limited to only such an alignment.

Thereafter, as indicated in operation 906, a ray cast projection of the aligned data set is performed to construct a two-dimensional image that contains three-dimensional image information. Each of the plurality of pixels comprising a two-dimensional representation of the information in the multi-dimensional data set is ray cast along a vector parallel with the view axis indicated in operation 902. Once the image information contained within the aligned data set is projected, a portion of a structure-of-interest can be located within the projected image as indicated in operation 908.

Next, method 900 continues with operation 910 by identifying a two-dimensional plane that intersects the located portion-of-interest. In preferred embodiments, the two-dimensional plane identified in operation 910 is orthogonal to the view axis indicated in operation 902. However, method 900 is not limited to only such an alignment. Method 900 continues by generating a faceplate that comprises voxels that both contain structure-of-interest information and that intersect the two-dimensional plane. Thereafter, method 900 generates a composite view responsive to the faceplate as indicated in operation 914. The composite view may comprise a function of image information from the faceplate only, a function of image information from voxels that intersect the faceplate, and/or a function of both. These functions can include operator selected variables for controllably adjusting the composite image. As indicated in operation 916, the composite view may be rendered to a display device in accordance with known two-dimensional rendering methods.

Figure 10:
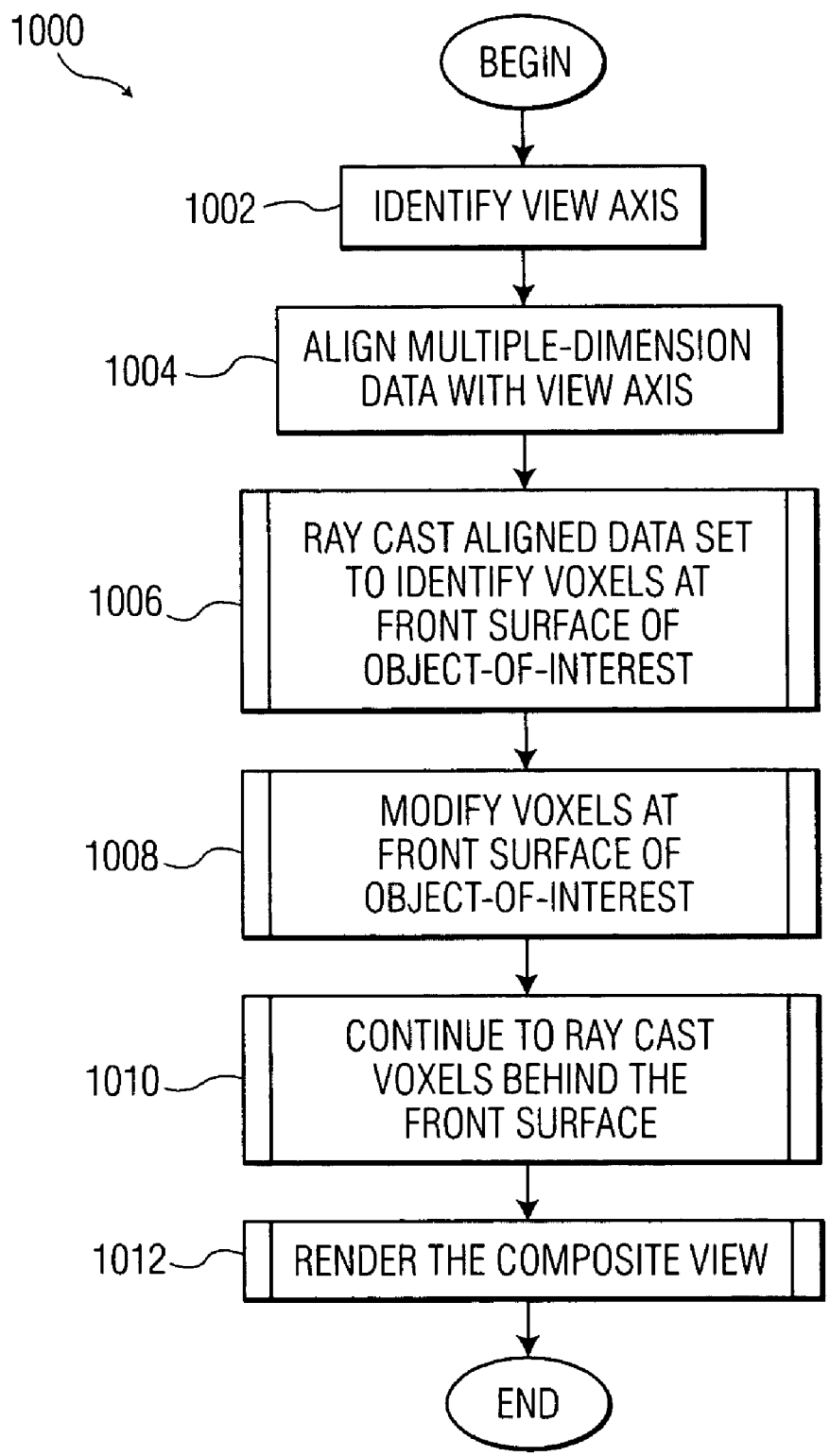
FIG. 10 is a flow chart illustrating an alternative embodiment of a method for improved multiple-dimension image displays that may be implemented by the computing device of FIG. 6.

An alternative method for generating improved multi-dimensional image displays that may be implemented by the image-management system 120 of FIG. 1 is illustrated in FIG. 10. Method 1000 begins with identifying a view axis as indicated in operation 1002. Next, as shown in operation 1004, the multiple-dimension data set is aligned in response to the view axis. In preferred embodiments, the multiple-dimension data is aligned such that one of the axes is parallel with respect to the view axis. However, method 1000 is not limited to only such an alignment. Thereafter, as indicated in operation 1006, a ray cast projection of the aligned data set is performed to identify voxels containing information forming a front surface of an object-of-interest. In step 1008, voxels identified in step 1006 are modified. Modification includes an adjustment or weighting of one or more voxel parameters such as opacity and color density. As shown in step 1010, ray casting continues for voxels behind the front surface along each of the ray cast lines. In step 1012, the ray cast information forming a composite view is rendered.

In the alternative method 1000 illustrated in FIG. 10, a non-planar faceplate is generated. While the method illustrated in FIG. 9 generates a composite image by combining image information at an identified faceplate after ray casting the multi-dimensional data set, the method of FIG. 10 generates a composite view by modifying image data during raycasting. As the image management system 120 sums, integrates, or MIP maps voxels along each ray cast line 412 through the multi-dimensional data set 350, the image management system 120 compares the opacity value of each voxel with a threshold value. When the opacity value associated with a particular voxel along the ray cast line 412 exceeds the threshold, the image management system 120 modifies the voxel before processing the remaining voxels along the ray cast line 412. The plurality of modified voxels forms a faceplate shaped like the front surface of the object-of-interest. Image information associated with the remaining voxels along each ray cast line 412 generate a three-dimensional image of structures located within the multi-dimensional data set 350 behind the front surface.

It should be emphasized that the above-described embodiments of the image-management system and its various components are merely possible examples of implementations, merely set forth for a clear understanding of the principles of the system and method for improved multi-dimensional image displays. Many variations and modifications may be made to the above-described embodiment(s) without departing substantially from the principles described. All such modifications and variations are intended to be included herein within the scope of the following claims.

The invention claimed:

1. An interactive multiple-dimensional imaging system, comprising: means for interactively selecting a view perspective with respect to a multiple-dimensional data set; means for analyzing the multiple-dimensional data set to identify at least one structure-of-interest represented in the data set, the means for analyzing responsive to the view perspective; means for identifying the foremost portion of the structure-of-interest responsive to the means for analyzing; means for associating a set of data points responsive to the means for identifying to generate a faceplate; and means for applying the faceplate to the multiple-dimensional data set.

2. The system of claim 1, wherein the means for analyzing is responsive to a multiple-dimensional data set comprising spatial information encompassing the structure-of-interest over time.

3. The system of claim 1, wherein the means for associating a set of data points identifies a two-dimensional plane-of-interest within the multiple-dimensional data set.

4. The system of claim 3, wherein the two-dimensional plane-of-interest is orthogonal to the view perspective.

5. The system of claim 3, wherein the two-dimensional plane-of-interest comprises a pixel having an opacity value that exceeds a threshold.

6. The system of claim 5, wherein the pixel comprises information responsive to light transmitted through the structure-of-interest.

7. The system of claim 1, wherein the means for associating a set of data points is responsive to a configurable input.

8. The system of claim 1, wherein the means for applying the faceplate comprises a mathematical combination of pixel values associated with the faceplate with corresponding voxel values associated with the multiple-dimensional data set.

9. The system of claim 1, wherein the means for applying the faceplate comprises selectively replacing voxel values from the multiple-dimensional data set with corresponding pixel values associated with the faceplate.

10. The system of claim 9, wherein pixel values associated with the faceplate are adaptively adjusted in response to at least one voxel value associated with an adjacent voxel from the multiple-dimensional data set.

11. The system of claim 1, further comprising: means for generating a time-based sequence comprising a plurality of composite views of the faceplate and the multiple-dimensional data set.

12. The system of claim 11, further comprising: means for rendering the time-based sequence of composite views at a refresh race suitable for observing moving structures of a heart.

13. A method for viewing information within a multiple-dimension data set, comprising: identifying a view axis that intersects a multiple-dimensional data set; modifying the multiple-dimensional data set to align one of the dimensions of the multiple-dimension data set responsive to the view axis; locating a portion of a structure-of-interest with respect to a distance along a vector parallel to view axis; associating a set of pixels with a faceplate; and generating a composite view in accordance with the faceplate.

14. The method of claim 13, wherein identifying a view axis comprises responding to a viewer instruction.

15. The method of claim 13, wherein modifying the multiple-dimensional data set comprises spatially adjusting a reference axis in accordance with the view axis.

16. The method of claim 13, wherein locating a portion of a structure-of-interest comprises identifying a two-dimensional plane-of-interest orthogonal to the view axis.

17. The method of claim 16, wherein the two-dimensional plane-of-interest is responsive to a viewer instruction.

18. The method of claim 13, wherein associating a set of pixels with a faceplate comprises comparing a voxel value associated with a voxel along a ray cast line with a threshold.

19. The method of claim 13, wherein generating a composite view comprises mathematically combining a voxel value associated with the faceplate with a corresponding voxel value associated with the multiple-dimensional data set.

20. The method of claim 13, further comprising: repeating the modifying step over a plurality of time-variant values from the multiple-dimensional data set.

21. A multiple-dimensional imaging system, comprising: a memory-storage unit configured to store a multiple-dimensional data set; a multiple-dimensional image processor communicatively coupled to the memory-storage unit, the image processor configured to convert the multiple-dimensional data set to a two-dimensional representation in a plane orthogonal to an operator-identified view axis; and an image-rendering device communicatively coupled to the image processor, the rendering device configured to display the two-dimensional representation of a volume-of-interest contained within the three-dimensional data set, wherein the two-dimensional representation is responsive to a faceplate orthogonal to the view axis that includes information associated with a structure-of-interest.

22. The system of claim 21, further comprising: an operator interface configured to selectively generate a view axis responsive to a representation of the volume-of-interest.

23. The system of claim 22, wherein the multiple-dimensional image processor generates the faceplate in accordance with an operator selected preference.

24. The system of claim 21, wherein the multiple-dimensional image processor mathematically combines a voxel value associated with the faceplate with a corresponding voxel value associated with the multiple-dimensional data set.

25. The system of claim 21, wherein the memory-storage unit contains a time-variant three-dimensional data set and the image-rendering device generates a sequence of two-dimensional representations at a refresh rate suitable for observing moving structures within the volume-of-interest.

26. A computer-readable medium having processor-executable instructions thereon which, when executed by a processor, direct the processor to: apply an input indicative of an operator preference for a spatial arrangement of a representation of a volume-of-interest located within a multiple-dimensional data set; generate a faceplate corresponding with a structure within the volume-of-interest along a view axis responsive to the operator preference; and combine the faceplate with information from the multiple-dimensional data set to generate a two-dimensional array of pixels representing the structure.

27. The computer-readable medium of claim 26, wherein the faceplate comprises a two-dimensional plane-of-interest within the multiple dimensional data set.

28. The computer-readable medium of claim 27, wherein the two-dimensional plane-of-interest is orthogonal to the view axis.

29. The computer-readable medium of claim 27, wherein the two-dimensional plane-of-interest comprises a pixel having an opacity value that exceeds a threshold.

30. The computer-readable medium of claim 29, wherein the pixel comprises information responsive to light transmitted through the structure-of-interest.

31. The computer-readable medium of claim 26, wherein the means for associating a set of data points is responsive to a configurable input.

32. The computer-readable medium of claim 26, wherein information from the multiple-dimensional data set is mathematically combined with information defining the faceplate in response to an operator configurable parameter.

* * * * *